US008332076B2

(12) United States Patent
Fischle et al.

(10) Patent No.: US 8,332,076 B2
(45) Date of Patent: Dec. 11, 2012

(54) WIND FARM WITH PLURAL WIND TURBINES, AND METHOD FOR REGULATING THE ENERGY FEED FROM A WIND FARM

(75) Inventors: Kurt Fischle, Hamburg (DE); Ulrich Harms, Hamburg (DE); Mark Jurkat, Schinkelring (DE); Kay Richter, Heidbergstr (DE)

(73) Assignee: Nordex Energy GmbH, Norderstedt (DE)

( * ) Notice: Subject to any disclaimer, the term of this patent is extended or adjusted under 35 U.S.C. 154(b) by 494 days.

(21) Appl. No.: 12/488,704

(22) Filed: Jun. 22, 2009

(65) Prior Publication Data
US 2010/0268393 A1 Oct. 21, 2010

(30) Foreign Application Priority Data

Apr. 17, 2009 (DE) .......................... 10 2009 017 939

(51) Int. Cl.
*H02J 3/38* (2006.01)
*F03D 9/00* (2006.01)

(52) U.S. Cl. ............... 700/287; 700/34; 290/44; 290/55 M

(58) Field of Classification Search ..................... 700/34, 700/286–287; 290/44, 55
See application file for complete search history.

(56) References Cited

U.S. PATENT DOCUMENTS

| 7,571,013 | B2 * | 8/2009 | Altemark ..................... 700/34 |
| 7,606,638 | B2 * | 10/2009 | Fortmann et al. ............. 700/287 |
| 2006/0255594 | A1 * | 11/2006 | Larsen ........................ 290/44 |
| 2007/0177314 | A1 * | 8/2007 | Weng et al. .................. 361/20 |

FOREIGN PATENT DOCUMENTS

| DE | 10 2004 060 943 A1 | 7/2006 |
| EP | 1 512 869 A1 | 9/2004 |
| WO | 0173518 A1 | 10/2001 |

OTHER PUBLICATIONS

"A novel centralised wind farm controller utilising voltage control capability of wind turbines", by Jens Fortmann et al, from 16th Power Systems Computation Conference, Jul. 2008, Glasgow, Scotland.

* cited by examiner

*Primary Examiner* — John R. Cottingham
*Assistant Examiner* — Douglas Lee
(74) *Attorney, Agent, or Firm* — Vidas, Arrett & Steinkraus P.A.

(57) ABSTRACT

A wind farm with plural wind turbines which are connectible to a farm grid that is in turn connectible to an electricity supply mains via a connection point, wherein the wind farm features the following: a central control system, which determines a correction value for a local desired value for one or plural wind turbines by way of a first regulator, depending on an actual value of an electric variable before or after the connection point, and a turbine control for at least one wind turbine, which determines a local desired value for an electric variable to be generated by the wind turbine by way of a second regulator, depending on an actual value of an electric variable measured in the farm grid, wherein the turbine control determines the sum of the local desired value and the correction value as the total desired value for the electric variable of the wind turbine to be generated.

24 Claims, 4 Drawing Sheets

WIND FARM WITH PLURAL WIND TURBINES, AND METHOD FOR REGULATING THE ENERGY FEED FROM A WIND FARM

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a wind farm with plural wind turbines, and a method for regulating an electric variable fed into an electricity supply mains by a wind farm having plural energy turbines.

There is an increasing demand by the companies which operate electricity supply mains that wind farms actively contribute to the regulation of the grid voltage. Demands concerning the promptness of the regulation are also made in this, which necessitate additional measures for the promptness of the regulation, in particular in wind farms with wind turbines that are spatially positioned far away from each other.

From DE 10 2004 0 60 943 A 1, the entire contents of which is incorporated herein by reference, a wind farm power regulation is known, in which a farm master is provided for the control of the wind turbines. The farm master has a power regulator, which is realised with multiple circuits, wherein one of the circuits for power regulation is realised as a fast closed loop, which presets the power output for a first group of the wind turbines. A second circuit, which acts on a second group of the wind turbines, is realised as a slow closed loop. The repartition of the wind turbines into two groups has the effect that a first group can quickly react to changes and disturbances of the desired value, whereas the steady state accuracy is achieved by way of the slowly regulated second group of wind turbines.

From an article "A novel centralised wind farm controller utilising voltage control capability of wind turbines" by Jens Fortmann et al., the entire contents of which is incorporated herein by reference, which was published for the 16th Power Systems Computation Conference in July 2008 in Glasgow, a cascade regulation of wind turbines in a wind farm is known. In this, a fast continuous voltage regulation on the level of the wind turbines is combined with a relatively slow desired value regulation on the wind farm level. Desired voltage values for the control of the wind turbine are set on the wind farm level. The desired voltage value for the wind turbine is compared with the measured actual value in the wind turbine, and the difference is supplied to a voltage regulator as the control deviation. The regulator on the wind farm level is realised as a slow regulator in this, in order to avoid undesired regulation interventions. In this regulation approach for the wind farm, the regulator arranged on the farm level outputs its manipulated variable as an input variable to a voltage regulator in the wind turbine.

From EP 1 512 869 A1, the entire contents of which is incorporated herein by reference, a voltage regulation for a wind farm is known in which a voltage regulator on the farm level determines a desired value for a reactive power to be manipulated, which is applied to a turbine control of the individual wind turbines. The turbine regulates the reactive power which it generates to this preset desired value. The regulator on the turbine level is realised as a fast regulator, whereas the regulator on farm level is realised as a slow regulator. A cascaded arrangement of the regulators is selected even in this, because the slow regulator on the farm level applies its manipulated variable as a desired value to the fast regulator on the turbine level.

As is commonly known from control engineering, using a cascaded regulator structure is accompanied by less flexibility in the layout of the regulators.

The present invention is based on the objective to provide a wind farm and a method for controlling a wind farm, which permits a fast regulation by the individual wind turbines with simple means, but also permits a sufficiently high flexibility of the layout of the regulators and a fast regulator intervention even at wind turbines that are positioned far apart from each other.

BRIEF SUMMARY OF THE INVENTION

The wind farm according to the present invention may have plural wind turbines, which feed the individually generated power into a farm grid at first. Below, the electric grid which leads from the individual wind turbines to a connection point inside the wind farm, is designated as a farm grid, whereas the electric grid beyond the connection point is defined as the electricity supply mains. According to the present invention, the wind farm has a central control system, which is sometimes also called a farm master. The central control system determines a correction value for a local desired value for one or plural wind turbines by way of a first regulator, depending on an actual value of an electric variable before or after the connection point. The central control system does not preset any desired value for the individual wind turbines, but determines only an additive correction value, which is processed only together with a local correction value in the wind turbine. The wind farm according to the present invention has further a turbine control for at least one wind turbine. The turbine control determines a local desired value for the electric variable, depending on the actual value of the wind turbine in the farm grid, by way of a second regulator. Like also in individual wind turbines or in conventional wind turbines in the wind farm, the turbine control locally determines a local desired value for the wind turbine due to an actual value on the wind turbine. According to the present invention, the turbine control determines a total desired value from the sum of the local desired value and the correction value, which determines the electric variable of the wind turbine to be generated.

In contrast to the known methods for regulating a wind farm, the first and the second regulator are connected in parallel, i.e., the manipulated variables of the first and the second regulator are summed up in order to obtain an overall value. Even at wind turbines quite distant in space, in whose regulation the transmission and processing of control signals between the wind turbines may already have some importance, the parallel connection of a first and a second regulator provides a sufficient reaction time, without that it would be necessary to select a particularly fast data transmission medium for the signals inside the wind farm.

In a preferred embodiment of the wind farm, a constant or variable desired value for an electric variable to be regulated by the wind farm is applied to the first regulator. In principle, it must be assumed that the wind farm is operated with a constant desired value for the electric variable to be regulated by the wind farm. However, there may be cases in which a changed or time variable desired value is preset to the wind farm by the electricity supply company, which indicates to which target value an electric variable must be regulated.

In a preferred embodiment, the first regulator is realised as a regulator for voltage, power factor, reactive power or current. When used as a voltage regulator, an actual value and a desired value of the voltage is applied to the first regulator, when used as a power factor regulator, an actual value of the power factor before or after the connection point and a desired value of the power factor is applied to the power factor regulator. In the embodiment as a reactive power regulator, an actual value of the reactive power and a desired value of the reactive power are applied to the same. The same applies for the realisation as a current regulator, onto which an actual value of the current and a desired value for the current are then applied.

In a preferred extension of the wind farm of the present invention, the first regulator determines the correction value for a local desired value of the reactive current, the reactive power, the power factor or the phase angle as the manipulated variable. In general, the correction value is related to a local desired value, which is related to a reactive electric variable in the electricity supply mains.

In a practical embodiment, the central control system has a measuring unit, which measures an actual value of voltage, power factor, reactive power or current, before or after the connection point. The measuring unit of the central control system measures the actual value of voltage, power factor, reactive power or current on the wind farm level, i.e., on a line into which all the contributions of the wind turbines are fed. Preferably, the measuring unit is connected to a first regulator via a first data transmission medium. The data transmission medium has a defined protocol, which is dimensioned for the transmission of measurement data from the measuring unit to the first regulator. Preferably, the data transmission medium is realised as a fast data transmission medium, whose transmission time is short compared to the reaction time of the control circuit.

In a further preferred embodiment, the central control system has a conversion module, which converts the manipulated variable of the first regulator into correction values for individual wind turbines. The central control system with its first regulator works on the farm level, i.e., with real and desired values of the electric variable of the entire wind farm. In order to determine the correction values for individual wind turbines, a determined correction value, which consequently indicates the correction to be performed on farm level, is converted into correction values for individual wind turbines. In order to be able to capture preferably the operation condition or the power, respectively, of the individual wind turbines in this, the actual values and/or the local desired values of the individual wind turbines are applied to the conversion module. This avoids that the conversion module determines a correction value for a wind turbine, which cannot be achieved by the wind turbine, for instance.

In a practical embodiment, one turbine control is provided for each wind turbine, so that the wind turbines are controlled individually and not by a common turbine control. The correction values from the central control system are applied to the turbine controls of the individual wind turbines.

In a preferred embodiment, a constant desired value for an electric variable to be regulated by the wind turbine is applied to the second regulator. Thus, in the stationary case, the second regulator regulates the actual value to the constant desired value. In this, it must be taken into account that the correction value is still added to the local desired value, so that the actual value adjusted by the second regulator corresponds to the constant desired value only for the case that the correction value has the value zero.

Advantageously, even the second regulator is realised as a regulator for voltage, power factor, reactive power or current, the second regulator being realised corresponding to the first regulator. Namely, if the first regulator is realised as a voltage regulator, the second regulator is preferably realised as a voltage regulator also, whereas if the first regulator is realised as a current regulator or as another regulator, even the second regulator is realised as a current regulator or as correspondingly other regulator, respectively. In fact, in principle it is not necessary that first and second regulator be realised equally, however, this is advantageous in order to avoid the conversion of magnitudes.

Preferably, the second regulator generates the local desired value of the reactive current, the reactive power, the power factor or the phase angle as the manipulated variable. Like already in the first regulator, even the second regulator determines an electric variable, which is related to a reactive portion of the power supplied by the wind turbine. Even here, it holds that if the first regulator determines the correction value for the reactive current as the variable, the second regulator advantageously also determines the local desired value for the reactive current as the manipulated variable. This holds correspondingly for the reactive power, the power factor and the phase angle.

It has proven advantageous to provide a smoothing filter, which filters the correction value for the local desired value before the addition to the local desired value. For instance, the smoothing filter can filter out a high frequency component from the correction value for the local desired value, and increase the stability of the regulator in this way.

In an advantageous embodiment, the turbine control has a third regulator, to which the total desired value for the electric variable to be generated is applied. The third regulator generates a control signal for a power section of the wind turbine. The drive of the power section of the wind turbine, which comprises by way of example the converters and the generator as well as the drive thereof, is usually performed by way of a current regulator.

Preferably, even the turbine control has a measuring unit, which measures an actual value of the electric variable to be regulated by the wind turbine. The measuring unit of the turbine control measures the variable to be regulated on the wind turbine level. The electric variable regulated by the wind turbine must generally not necessarily be coincident with the electric variable supplied by the wind turbine. For instance, the voltage U can be regulated, whereas the reactive power Q represents the variable that is primarily fed in.

Preferably, the measuring unit of the turbine control is connected to the second regulator via a second data transmission medium. Because the measuring unit of the turbine control measures at a measurement point near the wind turbine, the second data transmission medium can be realised as a fast data transmission medium, whose transmission time is short compared to the reaction time of the closed loop.

According to the present invention, the objective is also achieved by a method for regulating an electric variable fed into an electricity supply mains by a wind farm having plural wind turbines. In the method, a correction value for a local desired value of one or plural wind turbines is applied to the at least one wind turbine by way of a first regulator, depending on an actual value of an electric variable. The measured actual value of an electric variable is applied to the first regulator, and the regulator outputs a correction value for the local desired value as the manipulated variable. In the method of the present invention, a local desired value for an electric variable generated by the wind turbine is determined for a turbine control of at least one wind turbine by way of a second regulator, depending on an actual value of an electric variable to be regulated by the wind turbine. The actual value of an electric variable to be regulated by the wind turbine is applied to the second regulator of the turbine control, and it serves to determine a local desired value for the generated electric variable as the manipulated variable for the second regulator. The total desired value for the electric variable generated by the wind turbine is determined as the sum of the local desired value and the correction value in the method of the present invention. This means that if the correction value for the local desired value has a value different from zero, not the local desired value is applied to the wind turbine as a desired value presetting, but the total desired value, which is different from the local desired value in this case. The method of the present invention has two parallel regulators, whose respective regulated quantities together form the desired value for the wind turbine.

In a preferred embodiment of the method of the present invention, the control deviation of a constant or variable desired value and an actual value of the electric variable in the electricity supply mains is formed in the first regulator. In this, the actual value of the electric variable in the supply mains can be captured before or after a connection point by way of which the wind farm is connected to the electricity supply mains.

In a further preferred embodiment, the first regulator determines a correction value for a local desired value of the reactive current, the reactive power, the power factor or the phase angle as the manipulated variable. These correction values are related to the reactive portion of a power that is fed into the electricity supply mains.

Preferably, the central control system converts the manipulated variable of the first regulator into correction values for individual wind turbines. As the first regulator determines the correction value as the manipulated variable based on input variables which are measured or preset on the wind farm level, this manipulated variable is preferably converted depending on the actual value and/or the local desired value of the wind turbine.

A constant desired value for the electric variable of the wind turbine to be regulated is applied to the second regulator. The second regulator determines the local desired value of the reactive current, the reactive power, the power factor or the phase angle as the manipulated variable, wherein the second regulator generates preferably a manipulated variable like that of the first regulator.

In the method of the present invention, the correction value is smoothened before an addition to the local desired value.

BRIEF DESCRIPTION OF THE FIGURES OF THE DRAWINGS

Examples of the realisation of the present invention are explained by means of figures below. They show.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated.

Figure 1:
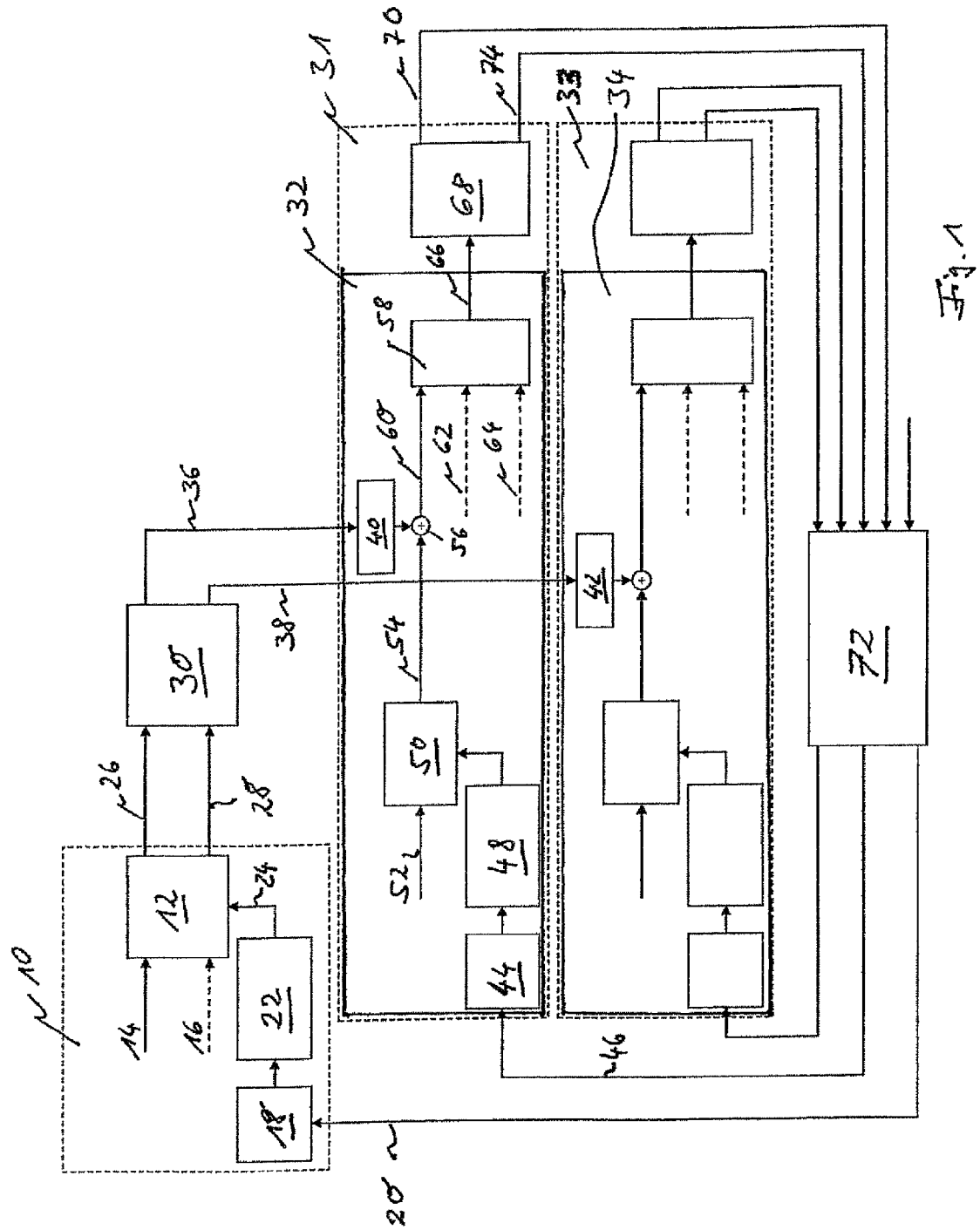
FIG. 1 a schematic view of the regulator structure of the present invention with two turbine controls, FIG. 2 a schematic view of the regulator structure of the present invention with two turbine controls, whose local desired values are applied to the central turbine control, FIG. 3 a flow chart of the central control system, FIG. 4 a flow chart for the turbine control.

FIG. 1 shows the central control system 10 with the first regulator 12, which is realised as a voltage regulator. A constant or variable desired value 14 for the voltage is applied to the voltage regulator 12. Further measurement signals 16, which are provided to the central control 10 by either the wind farm or the electricity company, can also be applied to the first regulator 12. The central control system 10 has further a measuring system 18, which is connected to a central measurement point and which captures an actual voltage value 20, which indicates the electric voltage of the wind farm at the connection point. The actual voltage value of the wind farm is applied to the first regulator 12 by the measuring system 18 via a fast data transmission medium 22. The forwarded actual voltage value 24 of the wind farm is applied to the first regulator 12 together with the desired voltage value 14. The first regulator 12 determines an additional reactive current value 26 for a first wind turbine from the applied variables, and an additional reactive current value 28 for a second wind turbine. The additional reactive current values 26 and 28 are correction values for the local desired reactive current value of the wind turbine.

The additional desired reactive current values 26 and 28 are forwarded to the turbine control 32 of the first wind turbine 31 and the turbine control 34 of the second wind turbine 33 via a slow data transmission medium 30. The forwarded additional desired reactive current values 36 and 38 are each one applied to a smoothing filter 40 and 42 of the turbine controls 32 or 34, respectively.

The wind farm that is to be regulated can be made up of significantly more than two wind turbines. For the sake of better clarity, the turbine control 32 of the first wind turbine 31 is described below, the design of the turbine control 34 of the second wind turbine 33 and that of the turbine controls of the further wind turbines being identical.

The turbine control 32 has a measuring system 44, which captures an actual voltage value 46 near the wind turbine. The captured actual voltage value of the wind turbine is forwarded to a second regulator 50 via a slow data transmission medium 48. A constant desired voltage value 52 is additionally applied to the second regulator 50. The constant desired voltage value 52 indicates the voltage that the wind turbine has to generate. The second regulator 50 is realised as a localised voltage regulator and generates a local desired value 54 for the reactive current to be adjusted.

In the shown realisation example, the first regulator 12 and the second regulator 50 are realised as voltage regulators, to which the voltage at the feeding point of the wind farm or the voltage at a measurement point near the wind turbine, respectively, is applied as an actual value. As the manipulated variable, the first regulator 12 and the second regulator 50 each output a contribution to the reactive current to be generated by the wind turbine. In the case of the first wind turbine, this is the additional desired reactive current value 26 and the forwarded additional desired reactive current value 36 and the manipulated variable 54 of the second regulator, respectively.

In the summing element 56, the local desired reactive current value 54 is summed up with the smoothened additional desired reactive current value. Then, the total desired reactive current value 60 is applied to a third regulator 58. The third regulator is realised as a current regulator, which processes the total desired reactive current value 60. At option, a real current desired value 62 and further measurement signals 64 can still be applied to this regulator. The third regulator generates a control signal 66 as the manipulated variable, which is applied to a power section 68 of the wind turbine. The control signal 66 presets to the power section 68 how generator and converter must be controlled in order to adjust a reactive current 70 that corresponds to the total desired reactive current value 60. The reactive current fed into the farm grid by the wind turbine acts on the actual voltage values 20 and 46 via the open-loop control system 72, so that the loop is closed. Moreover, besides to the reactive current 70, the wind turbines generate of course an effective current 74, which also acts on the actual voltage values 20 and 46 via the open-loop control system 72.

The regulator structure shown in FIG. 1 consists of two closed loops working in parallel to each other. The first closed loop is formed by way of the open-loop control system 72, the real voltage value of the wind farm 20, the control system 10 with its central voltage regulator 12, the slow data transmission medium 30, by way of which the correction values for the local desired reactive current values 36 and 38 are transmitted, the current regulator 58 and the power section 68, by way of which a reactive current 70 and an active current 74 are fed into the open-loop control system 72. The closed loop working in parallel to this consists of the open-loop control system 72 and the actual voltage value 46 measured locally on the wind turbine 46, which is converted into a local desired reactive current value 54 by way of the second localised voltage regulator. The correction value 36 or the smoothed value thereof, respectively, and the local desired reactive current value 54 are summed up by the summing element 56, and from on there transmitted commonly via the current regulator 58. For understanding the regulator structure, it is important that the transmission of the correction values 26, 28 to the summing element 56 via the slow data transmission medium is sufficient for a significantly slower control characteristic of the regulation that takes place by the central control system. The regulation on the level of the wind turbine takes place in every case via a fast data transmission medium 48, so that a significantly more dynamic regulator 50 can be used here.

Figure 2:
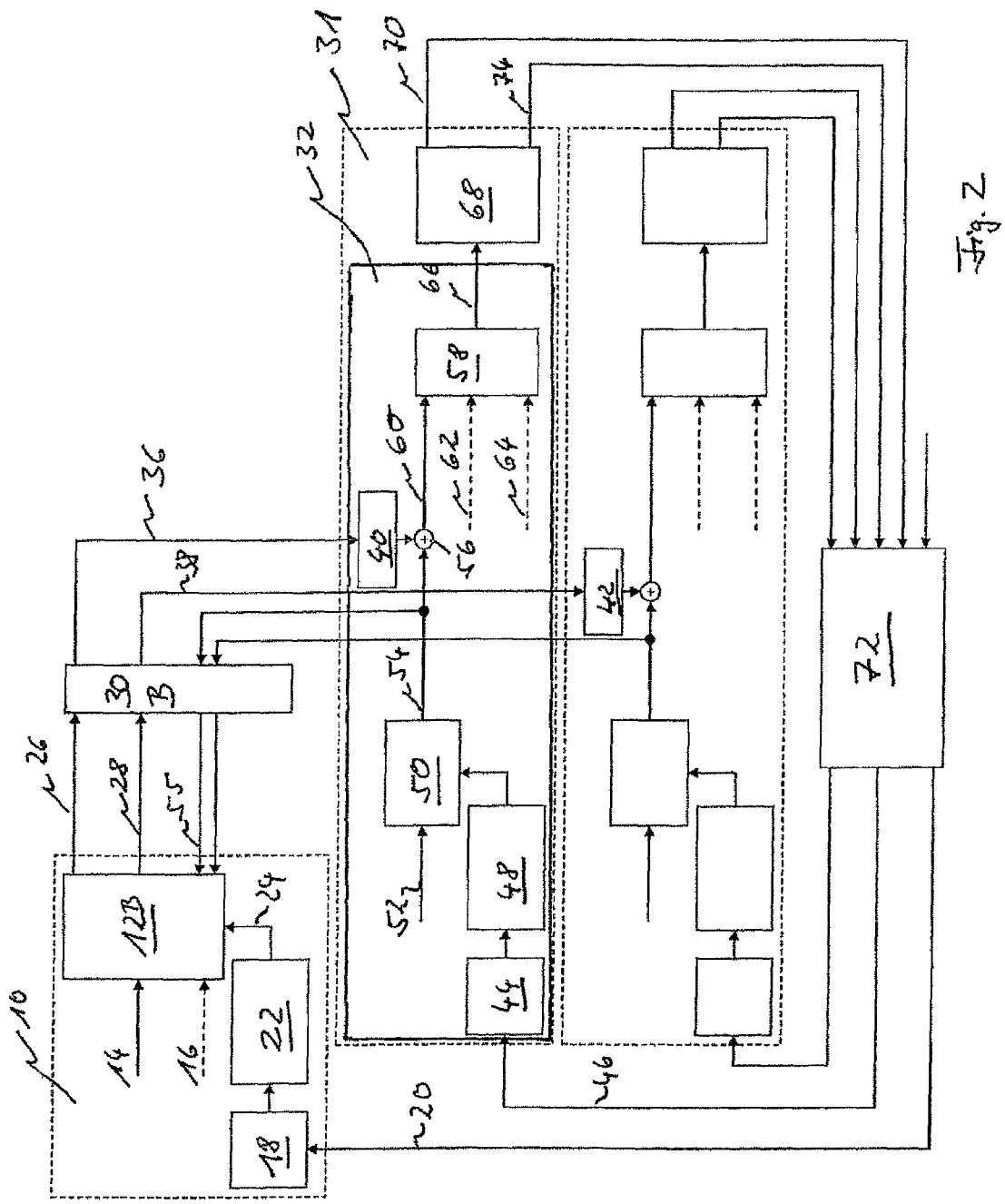

FIG. 2 shows a further realisation example, in which a recycling of the local desired reactive current values determined by the second regulator to the first regulator takes place via the slow data transmission medium. For the sake of better clarity, in FIG. 2 same elements are given same reference signs like those in FIG. 1. In case that individual elements are different in the varied regulator structure, this is indicated by the adjunct B.

The regulator structure of the further realisation example of FIG. 2 includes a feedback, by which the local desired reactive current value 54 is recycled to the first regulator 12B via the slow data transmission medium 30B. The recycled local desired reactive current value is represented as 55 in FIG. 2. By way of example, the first regulator can calculate a wanted system desired reactive current value for the entire wind farm, then subtract the sum of the local desired reactive current values from the same and apportion only the remaining difference to the correction values 26, 28. In this way, it is achieved that the sum of the total desired reactive current values 60 of all the turbines corresponds in the average to the wanted system desired reactive current value. Alternatively, the first regulator 12B can decide based on the recycled local desired reactive current value 55 how the correction values for desired reactive current values are to be apportioned to the individual wind turbines. For instance, if the first wind turbine 31 has a great desired reactive current value 54, the first regulator can correct the same only slightly by way of the correction value 26, and incorporate the necessary correction into the correction value 28 for the second wind turbine.

In the realisation example above, a regulator structure has been described in which the desired reactive current value has been determined by way of the voltage regulator 50, 12 or 12B, respectively. Alternatively, it is also possible to adapt the regulator structure to the power factor, the reactive power or the phase angle, in general it will be sufficient to take an arbitrary electric variable into consideration, which can influence the reactive power in the grid.

Figure 3:
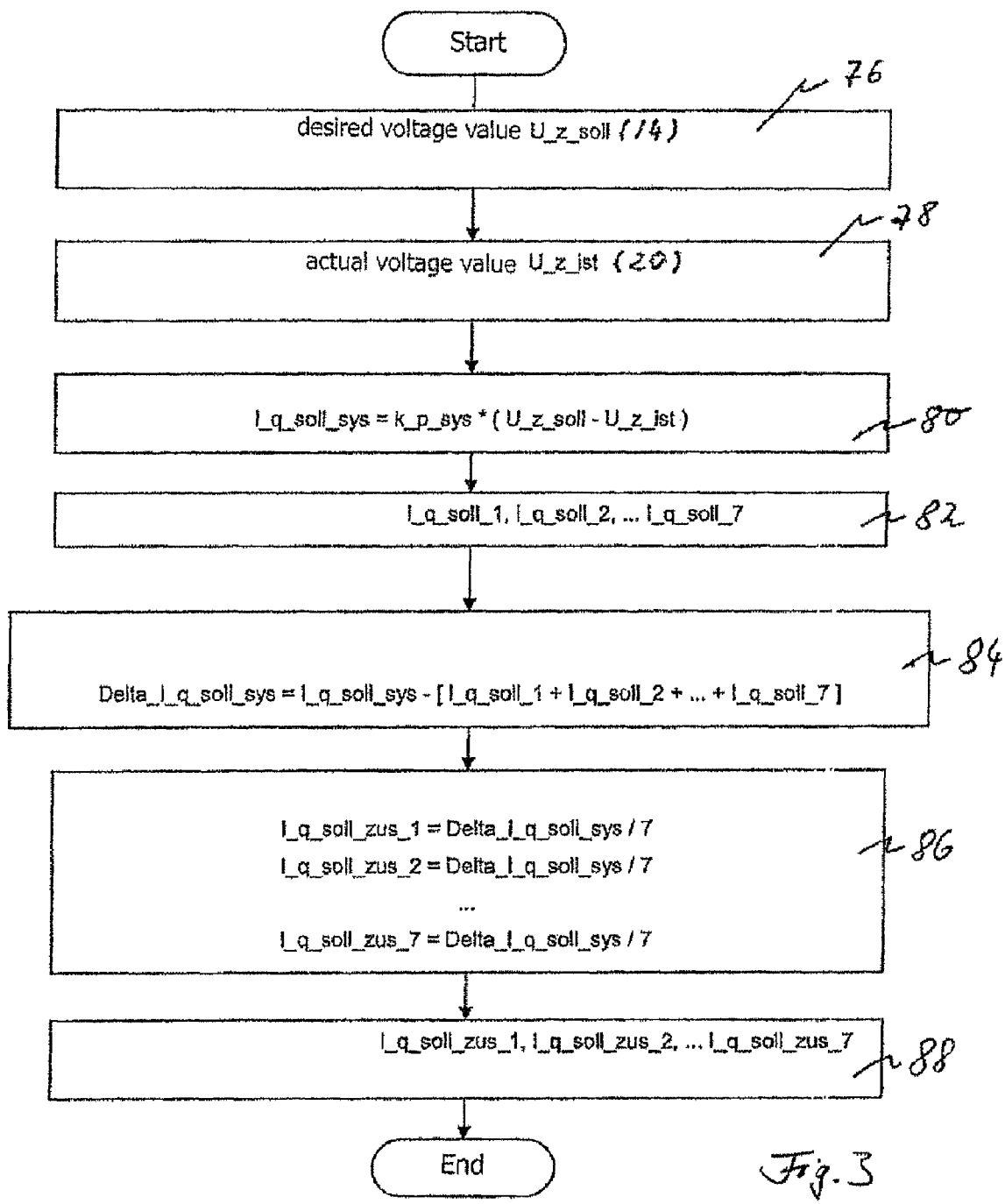

FIG. 3 shows in a flow chart the determination of the correction values for the desired reactive current value in the central control system 10. FIG. 3 shows in a first step 76 that a central desired voltage value 14 is read in. The central desired voltage value 14 can be limited and/or filtered in this.

In step 78, the central actual voltage value 24 is read in by the measuring system 18. Even the central actual voltage value 24 can be limited and/or filtered beforehand here.

In step 80, the correction value for the local desired value of the reactive current is formed according to a proportional regulation principle, wherein the difference between central desired voltage value and central actual voltage value is multiplied by a proportional amplification for the overall system (k_p_sys). The result is intermediately stored as a wanted system desired reactive current value (I_q_soll_sys).

In step 82, the locally determined desired reactive current values (I_q_soll_1 up to I_q_soll 7) of the individual wind turbines are read in.

In step 84, the difference between the wanted system desired reactive current value and the sum of the local desired reactive current values is calculated. (Delta_I_q_soll_sys). The difference foamed in this way indicates about which amount the local desired values determined by the turbines have to be corrected altogether, in order to reach the wanted system desired reactive current value.

In step 86, the difference is divided by the number of the wind turbines, in order to determine the additional desired reactive current values (I_q_soll_zus_1 bis I_q_soll_zus_7). In the shown example, a wind farm with seven turbines is supposed, so that 1/7 of the difference is forwarded as a correction value for every turbine.

Figure 4:
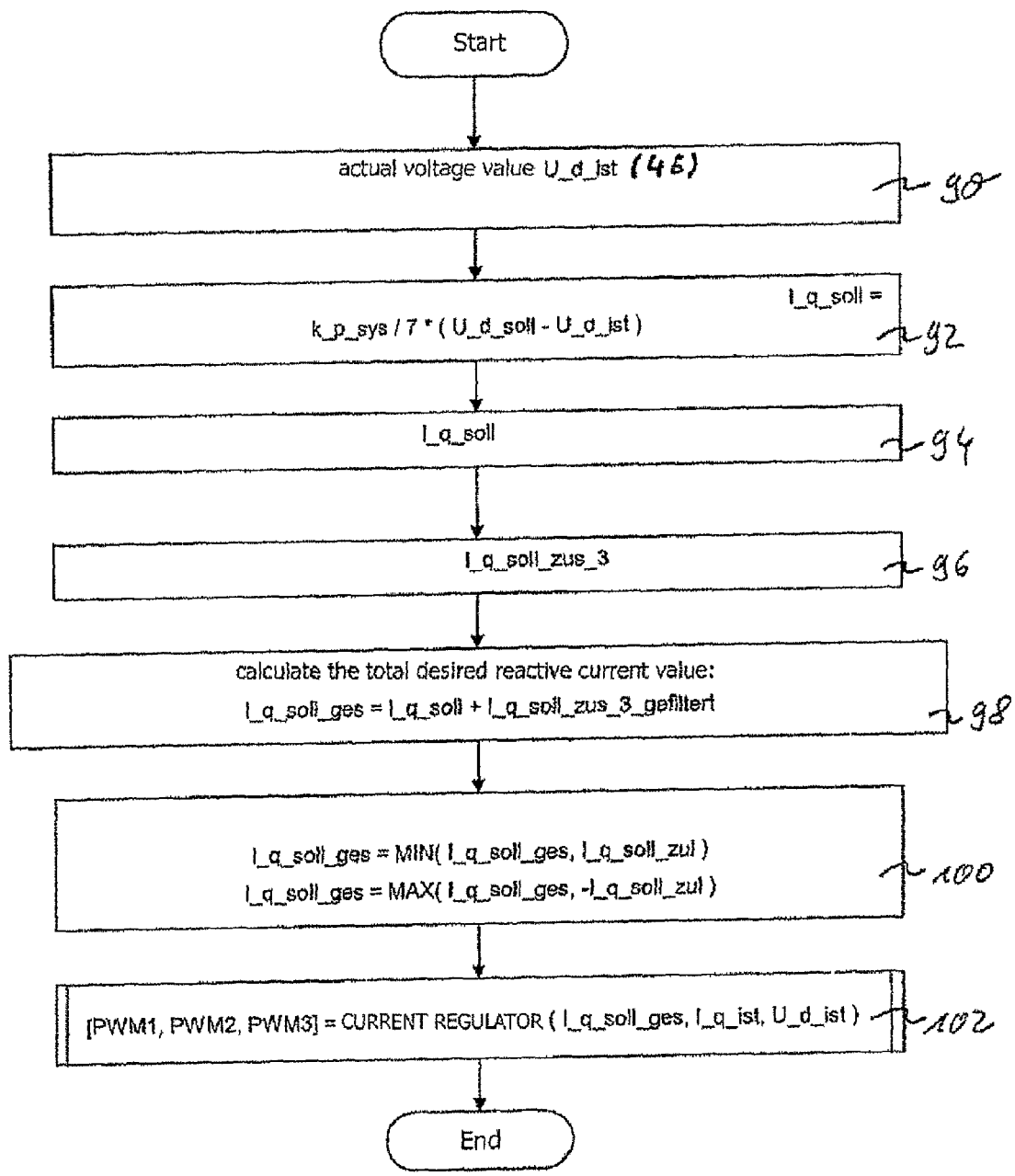

In step 88, the additional desired reactive current values are output as correction values and applied to the individual wind turbines. FIG. 4 shows a flow chart for the turbine control. In step 90, a localised actual voltage value 46 is read in. The actual voltage value is localised, because it is measured on the wind turbine near its feeding point.

In step 90, a local desired value for the reactive current is calculated according to the proportional regulation rule, making recourse to the proportionality factor (k_p_sys) from step 80. In step 94, the local desired reactive current value (I_q_soll) is recycled into the central control system. This corresponds to step 82 of FIG. 3.

Below, the correction value for the desired reactive current value (I_q_soll_3) is read in and filtered in step 96. This value is output by the system control in step 88 of FIG. 3.

In step 98, the turbine control determines the total desired reactive current value (I_q_soll_ges) as the sum of the locally determined desired reactive current value (I_q_soll) and the filtered additional desired value (I_q_soll_3_gefiltert) for the reactive current.

In a subsequent step 100, the total desired reactive current value (I_q_soll_ges) is limited to an admissible range (−I_q_soll_zul bis I_q_soll_zul), whose values are preset for the wind turbine. The total desired value of the reactive current is limited by way of the generation of a minimum and a maximum of the total desired value for the reactive current, using the maximum admitted positive desired reactive current value and the maximum admitted negative desired reactive current value.

By the completing process step 102, the turbine control signals are generated as pulse width modulated signals for driving the power section.

Altogether, it is possible to vary the regulator processes described above. For instance, in step 80 it is possible to use an integral regulation principle in the central control system, instead of the proportional regulation principle. In addition, it is possible to omit the steps 82 and 84, in which the local desired values for the reactive current are processed. Instead, the integral portion of the desired reactive current value, generated for instance using the integral regulation principle, can be divided by the number of the wind turbines, and the quotient can be forwarded as the correction value.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A wind farm with plural wind turbines, which are connectible to a farm grid, that is in turn connectible to an electricity supply mains via a connection point, wherein the wind farm comprises:
    a central control system (10), which determines a correction value (26, 28) for a local desired value (54) for one or plural wind turbines by way of a first regulator (12, 12B), depending on an actual value of an electric variable before or after the connection point; and
    a turbine control (32) for at least one wind turbine, which determines a local desired value (54) for an electric variable to be generated by the wind turbine by way of a second regulator, depending on an actual value of an electric variable measured in the farm grid, wherein the turbine control determines a total desired value (60) for the electric variable of the wind turbine to be generated by summing the local desired value (54) and the correction value (36).

2. The wind farm according to claim 1, characterized in that a constant or variable desired value (14) for an electric variable to be regulated by the wind farm is applied to the first regulator (12, 12B).

3. The wind farm according to claim 1, characterized in that the first regulator (12, 12B) is realized as a regulator for voltage, power factor, reactive power or current.

4. The wind farm according to claim 1, characterized in that the first regulator (12) determines the correction value (26, 28) for a local desired value (54) of the reactive current, the reactive power, the power factor or the phase angle as the manipulated variable.

5. The wind farm according to claim 1, characterized in that the central control system (10) has a measuring unit (18), which measures an actual value of voltage (20), power factor, reactive power or current, before or after the connection point of the wind farm.

6. The wind farm according to claim 5, characterized in that the measuring unit (18) is connected to the first regulator (12) via a first data transmission medium (22).

7. The wind farm according to claim 1, characterized in that the central control system (10) has a conversion module, which converts the manipulated variable of the first regulator into one correction value (38) for each individual wind turbine.

8. The wind farm according to claim 7, characterized in that the actual values and/or the local desired values for the electric variable of the wind turbines to be generated are applied to the conversion module.

9. The wind farm according to claim 1, characterized in that one turbine control (32) is provided for each wind turbine, and the correction value (36, 38) from the central control system (10) is applied to the turbine control.

10. The wind farm according to claim 1, characterized in that a constant desired value (52) for an electric variable measured in the farm grid by the wind turbine is applied to the second regulator (50).

11. The wind farm according to claim 1, characterized in that the second regulator (50) is realized as a regulator for voltage, power factor, reactive power or current.

12. The wind farm according to claim 1, characterized in that the second regulator (50) determines the local desired value of the reactive current, the reactive power, the power factor or the phase angle as the manipulated variable.

13. The wind farm according to claim 1, characterized in that a smoothing filter (40) is provided, which filters the correction value (36) for the local desired value before the addition (56) to the local desired value.

14. The wind farm according to claim 1, characterized in that the turbine control (32) has a third regulator (58), to which the total desired value (60) for the electric variable to be generated is applied, and which emits one or plural control signals (66) for a power section (68) of the wind turbine.

15. The wind farm according to claim 1, characterized in that the turbine control has a measuring unit (44), which measures an actual value of voltage, power factor, reactive power or current on or near the wind turbine.

16. The wind farm according to claim 15, characterized in that the measuring unit (44) of the turbine control (32) is connected to the second regulator (50) via a second data transmission medium (48).

17. A method for regulating an electric variable fed into an electricity supply mains by a wind farm having at least one wind turbine, the method comprising:

determining, via a central control system, a correction value (26, 28) for a local desired value (54) of one or plural wind turbines (31, 33) by way of a first regulator (12), depending on an actual value (24) of an electric variable; and determining, via a turbine control (32) for at least one wind turbine, the local desired value (54) for the electric variable to be generated by way of a second regulator (50), depending on an actual value of an electric variable measured by the wind turbine, wherein a total desired value (60) for the electric variable to be generated by the wind turbine is determined by summing the local desired value (54) and the correction value (36).

18. The method according to claim 17, wherein the control deviation of a constant or variable desired value (14) and an actual value (24) of the electric variable in the electricity supply mains is formed in the first regulator (12).

19. The method according to claim 17, wherein the first regulator (12) determines a correction value (26; 28) for a local desired value of the reactive current, the reactive power, the power factor or the phase angle as the manipulated variable.

20. The method according to claim 17, wherein the central control system (10) converts the manipulated variable of the first regulator (12) into correction values (26, 28) for individual wind turbines.

21. The method according to claim 20, wherein the central control system (10) determines the correction variable for the wind turbines depending on the actual value and/or the local desired value (55) of the electric variable of the wind turbines.

22. The method according to claim 17, wherein a constant desired value (52) for the electric variable of the wind turbine to be regulated is applied to the second regulator (50).

23. The method according to claim 17, wherein the second regulator (50) determines the local desired value of the reactive current, the reactive power, the power factor or the phase angle as the manipulated variable (54).

24. The method according to claim 17, wherein the correction value (36) is smoothened before the addition to the local desired value (54).

\* \* \* \* \*